United States Patent [19]

Setoh et al.

[11] Patent Number: 6,106,938
[45] Date of Patent: Aug. 22, 2000

[54] POLYPROPYLENE COMPOSITION AND LAMINATED AND ORIENTED FILM THEREFROM

[75] Inventors: Ritsuo Setoh; Makoto Satoh; Katsunari Inagaki; Jun Ohara, all of Chiba, Japan

[73] Assignee: Sumitomo Chemical Company, Ltd., Osaka, Japan

[21] Appl. No.: 08/879,654

[22] Filed: Jun. 20, 1997

Related U.S. Application Data

[63] Continuation-in-part of application No. 08/572,048, Dec. 14, 1995, abandoned.

[30] Foreign Application Priority Data

Dec. 22, 1994 [JP] Japan .................................... 6-319673

[51] Int. Cl.$^7$ ...................................................... B32B 27/32
[52] U.S. Cl. ........................ 428/349; 428/515; 428/516; 428/910; 525/240
[58] Field of Search ..................... 428/515, 516, 428/349, 910; 525/240

[56] References Cited

U.S. PATENT DOCUMENTS

| | | | |
|---|---|---|---|
| 4,186,240 | 1/1980 | Matsuda et al. ........................ | 428/349 |
| 4,726,999 | 2/1988 | Kohyama et al. ...................... | 428/516 |
| 5,780,168 | 7/1998 | Satoh et al. ............................. | 428/515 |

FOREIGN PATENT DOCUMENTS

| | | |
|---|---|---|
| 0138054 | 4/1985 | European Pat. Off. . |
| 0252718 | 1/1988 | European Pat. Off. . |
| 0560326 | 9/1993 | European Pat. Off. . |
| 54-48846 | 4/1979 | Japan . |

*Primary Examiner*—Paul Thibodeau
*Assistant Examiner*—D. Lawrence Tarazano
*Attorney, Agent, or Firm*—Sughrue, Mion, Zinn, Macpeak & Seas, PLLC

[57] ABSTRACT

A polypropylene composition for a laminated and oriented film comprising (A) 73 to 97% by weight of a crystalline propylene random copolymer having a propylene content of 60 to 97% by weight, an ethylene content of 0 to 6% by weight and an α-olefin content of 3 to 40% by weight, (B) 2.5 to 17% by weight of a propylene- α-olefin random copolymer having a propylene content of 35 to 75% by weight and an α-olefin content of 25 to 65% by weight, and (c) 0.5 to 10% by weight of a crystalline propylene polymer. A polypropylene composition for a laminated and oriented film being film-formed for a long time without hurting a transparency and a low temperature heat-sealing property and having an excellent solvent resistance and an excellent hot-tack property, and a laminated and oriented film having this composition on a surface layer are provided.

12 Claims, No Drawings

POLYPROPYLENE COMPOSITION AND LAMINATED AND ORIENTED FILM THEREFROM

This is a Continuation-in-Part of application Ser. No. 08/572,048 filed Dec. 14, 1995 now abandoned.

FIELD OF THE INVENTION

The present invention relates to a polypropylene composition for a laminated and oriented film and a laminated and oriented film having this composition on a surface layer. More particularly, the present invention relates to a polypropylene composition for a laminated and oriented film and a laminated and oriented film having this propylene composition on a surface layer giving a film having an excellent balance of a solvent resistance and a hot-tack property and having an excellent film-forming property wherein it obstructs extremely rarely a transparency and a low-temperature heat-sealing property when a film is formed.

BACKGROUND OF THE INVENTION

As a polypropylene has a superior physical property, it is used for a wide usage such as for example, a packaging film field and the like. However, as a polypropylene film has a high temperature capable of heat-sealing by a single layer and its proper range of temperature is narrow, a polypropylene random copolymer wherein ethylene and/or α-olefin is randomly copolymerized is usually used for this kind of usage in order to enhance a heat-sealing property at low temperature. Besides, a random copolymer has the good random property of comonomer, and therefore, has an excellent transparency and heat-sealing property owing to a low crystallinity and a low melting point.

On the other hand, it had a defect that a solubility to an organic solvent, for example, a saturated hydrocarbon solvent being not preferred in food sanitation increases remarkably in accordance with the increase of ethylene and/or α-olefin content.

As the process for preparing this propylene random copolymer, a try preparing a propylene random copolymer by the so-called gas phase polymerization method wherein a solvent or an active monomer liquid did not exist substantially has been done recently. However, for example, according to a method described in Japanese Unexamined Patent Publication No.63-276541(1988), a propylene-butene-1 copolymer being main component was prepared by a gas phase polymerization method. However, it had 15% or more of a soluble part in xylene at 20° C. and made a blocking resistance and a bleed whitening property more worse, and therefore, it is not yet adequate as a film for packaging. Particularly, this defect is apt to appear in case of a film-forming with a big processing machine. Besides, it has a lot of low molecular weight component being not preferable for a film for packaging as a low temperature heat-sealing modifier. Therefore, although it has a good low temperature heat-sealing property, an attachment on a roll in case of orienting with a vertical roll when a film is prepared for a long time increases and a film-forming property becomes inferior.

Besides, although a method described in Japanese Unexamined Patent Publication No. 61-248740 (1986) improved a low temperature heat-sealing property as a composition, propylene-ethylene copolymer and propylene-ethylene-butene-1 copolymer being a main component have a high melting point of 140° C. or more owing to a low content of comonomer and the appearance of a high hot-tack strength is yet inadequate. In Japanese Unexamined Patent Publication No.56-58861(1981), a film having an improved transparency and low temperature heat-sealing property is described, but propylene-ethylene copolymer and propylene-ethylene-butene-1 copolymer being a main component become a copolymer having a high melting point owing to a low content of comonomer and it has a problem in a hot-tack property. In Japanese Unexamined Patent Publication No.64-18633(1989), propylene-ethylene copolymer and propylene-ethylene-butene-1 copolymer being a main component are prepared by a bulk polymerization method and it is inadequate to give a preferable hot-tack property owing to a low content of comonomer.

Under these circumstances, the present inventors had already applied Japanese Patent Application No. 6-92317 (1994) as a composition having an excellent balance of a low temperature heat-sealing property and a hot-tack property. Besides, the present inventors applied Japanese Patent Application No.5-262340 (1993) in order to obtain a polypropylene random copolymer composition having an excellent balance of a low temperature heat-sealing property and a hot-tack property.

The present inventors had an extensive study on the development of this polypropylene random copolymer composition. As the results, the present inventors found that the above-mentioned purpose could be attained by a composition comprising a crystalline propylene random copolymer having a specified range of α-olefin content, propylene-α-olefin random copolymer having a specified range of α-olefin content and a specified range of a crystalline propylene homopolymer, and completed the present invention.

SUMMARY OF THE INVENTION

An object of the present invention is to provides a polypropylene composition for a laminated and oriented film being film-formed for a long time without hurting a preferable property which a polypropylene film has originally, that is, a transparency and a heat-sealing property and having an excellent balance of a solvent resistance and a hot-tack property, and a laminated and oriented film having this composition on a surface layer.

The present invention relates to a polypropylene composition for a laminated and oriented film comprising (A) 73 to 97% by weight of a crystalline propylene random copolymer having a propylene content of 60 to 97% by weights an ethylene content of 0 to 6% by weight, an α-olefin content of 3 to 40% by weight and a soluble part in xylene at 20° C. of 25% by weight or less, (B) 2.5 to 17% by weight of a propylene-α-olefin random copolymer having a propylene content of 35 to 75% by weight, an α-olefin content of 25 to 65% by weight and a soluble part in xylene at 20° C. of 75% by weight or more, and (C) 0.5 to 10% by weight of a crystalline propylene polymer.

Further, the present invention relates to a laminated film having the above-mentioned composition on a surface layer.

According to the present invention, there can be obtained a composition comprising a crystalline propylene random copolymer having a range of α-olefin content enough to reveal a high hot-tack strength, a propylene-α-olefin random copolymer having a little content of a low molecular weight polymer to enhance a low temperature heat-sealing property and a crystalline propylene homopolymer to enhance a hot-tack property and an excellent solvent resistance, and a film having an excellent solvent resistance and an excellent hot-tack property by laminating the said composition on one side or both side of a crystalline polypropylene film without hurting a stable film-forming property for long time, a transparency and a heat-sealing property.

DETAILED DESCRIPTION OF THE INVENTION

The present invention is illustrated in detail as follows.

The crystalline propylene random copolymer (A) used in the polypropylene composition of the present invention is a random copolymer having a propylene content of 60 to 97% by weight which is obtained by copolymerization of propylene with α-olefin or propylene with α-olefin and ethylene.

The α-olefin includes an α-olefin having 4 to 10 carbon atoms, for example, butene-1, pentene-1, hexene-1, heptene-1, octene-1, 3-methyl-pentene-1 and the like. Among these, butene-1 is the most preferable.

The contents of propylene, ethylene and α-olefin in the crystalline propylene random copolymer (A) are 60to 97%, preferably 65 to 92%, more preferably 65 to 83% by weight, 0 to 6%, preferably 0 to 5% by weight and 3 to 40%, preferably 3 to 35%, more preferably 13 to 35% by weight, respectively.

When the propylene content is less than 60% by weight, a melting point is too low and the film-forming property becomes inferior. When the propylene content is more than 97% by weight, the melting point is high and the low temperature heat-sealing property becomes insufficient. The ethylene component is not an essential component but the content of up to around 6% by weight is preferred from the view point of the film-forming property for long time and the hot-tack strength. Besides, the content of α-olefin is preferably 3 to 40% by weight. When the content is less than 3% by weight, the melting point is high and the hot-tack strength is not revealed. When the content is more than 40% by weight, the film-forming property becomes inferior. Further, in case of the propylene-α-olefin copolymer containing no ethylene, the contents of propylene and α-olefin are preferably 65 to 83%, more preferably 65 to 80% by weight, and preferably 17 to 35%, more preferably 20 to 35% by weight.

The crystalline propylene random copolymer (A) preferably has not more than 25% by weight of a soluble part in xylene at 20° C. (referred to simply as "CXS" hereinafter), more preferably 1 to 20% by weight. When the CXS is within the above range, the film-forming property of the composition and hot tack property, film are more excellent.

As the crystalline propylene random copolymer (A), a polymer wherein a random copolymer obtained by copolymerization of propylene with α-olefin is decomposed by heating or peroxide to Mw/Mn of 5.5 or less, can be preferably used.

The crystalline propylene random copolymer (A) has usually [η] of 0.3 to 6.0 dl/g, preferably [η] of 0.8 to 5.0 dl/g, and more preferably [η] of 1.0 to 3.0 dl/g.

The crystalline propylene random copolymer (A) can be usually prepared by copolymerization of propylene with α-olefin with Ziegler-Natta catalyst and in certain circumstances, a soluble catalyst such as a metallocene too.

The preferable catalyst system includes a Ziegler-Natta catalyst system wherein titanium, magnesium, halogen and electron donor are at least essential, for example, a catalyst system composed of (a) a solid catalyst component comprising titanium, magnesium, halogen and electron donor as essential components, (b) an organometallic compound, and (c) a silicone compound indicated by the general formula $R^1R^2Si(OR^3)_2$ ($R^1$ represents an alicyclic hydrocarbon group having 5 to 20 carbon atoms and $R^2$, $R^3$ represent hydrocarbon groups having 1 to 20 carbon atoms.)

The solid catalyst component (a) in the above-mentioned catalyst system contains titanium, magnesium, halogen and electron donor as essential components, and it is generally obtained by treating with titanium tetra chlorides after treating a solid product obtained by reducing titanium compound with an organomagnesium compound with an ester compound.

The titanium compound is represented by the general formula $Ti(OR)_bX_{4-b}$ (R represents a hydrocarbon group having 1 to 20 carbon atoms, X is a halogen and b is a numeral $0<b\leq 4$.). The examples of R are an alkyl group such as methyl, ethyl, iso-propyl, butyl, iso-butyl, amyl, iso-amyl, hexyl, heptyl, octyl, decyl, dodecyl, and the like, an aryl group such as phenyl, cresyl, xylyl, naphthyl and the like, a cycloalkyl group such as cyclohexyl, cyclopentyl and the like, an allyl group such as propenyl and the like and an aralkyl group such as benzyl and the like.

As the magnesium compound, the any type of organomagnesium compound having magnesium-carbon bond can be used. The Grignard compound represented particularly by the general formula RMgX (wherein R represents a hydrocarbon group having 1 to 20 carbon atoms and X is a halogen.) and the magnesium compound represented by the general formula RR'Mg (wherein R and R' represent hydrocarbon groups having 1 to 20 carbon atoms and hereby R and R' may be same or different) are preferably used.

The Grignard compound includes methyl magnesium chloride, ethyl magnesium chloride, methyl magnesium bromide, ethyl magnesium bromide, ethyl magnesium iodide, propyl magnesium chloride, propyl magnesium bromide, n-butyl magnesium chloride, n-butyl magnesiumbromide, sec-butyl magnesium chloride, sec-butyl magnesium bromide, tert-butyl magnesium chloride, tert-butyl magnesium bromide, amyl magnesium chloride, iso-amyl magnesium chloride, phenyl magnesium chloride, phenyl magnesium bromide and the like, and the magnesium compound represented by RR'Mg includes diethyl magnesium, di-n-propyl magnesium, di-iso-propyl magnesium, di-n-butyl magnesium, di-sec-butyl magnesium, di-tert-butyl magnesium, n-butyl-sec-butyl magnesium, diamyl magnesium, diphenyl magnesium and the like.

The organoaluminum compound (b) used in combination with the solid catalyst component has at least one aluminum-carbon bond in a molecule. The example of this organoaluminum compound (b) includes a trialkylaluminum such as triethylaluminum, triisobutylaluminum, trihexylaluminum and the like, a dialkylaluminum halide such as a diethylaluminum halide (e.g. chloride, bromide), a diisobutylaluminum halide (e.g. chloride, bromide) and the like, a mixture of trialkylaluminum and dialkylaluminum halide, almoxane such as tetraethyldialmoxane, tetrabutyldialmoxane and the like. Among these organoaluminum compounds, trialkyl aluminum, the mixture of trialkylaluminum and dialkylaluminum halide, and tetraethyldialmoxane are preferred. Besides, the organoaluminum compound may be used in combination with a boron compound such as trityltetra (pentafluorophenyl)-borate and N,N'-dimethylaniriniumtetra(pentafluorophenyl)borate. The amount of the organoaluminum compound used can be selected in a wide range of 1 to 1000 moles per one atomic mole of titanium in the solid catalyst and particularly 5 to 600 moles are preferred.

The silicone compounds (c) of electron donor indicated by the general formula $R^1R^2Si(OR^3)_2$ are for example, cyclohexyl-dimethoxysilane, cyclohexylpropyldimethoxysilane, cyclohexylisopropyldimethoxysilane, cyclohexylbutyldimethoxysilane, cyclohexylisobutyldimethoxysilane, cyclohexyltertbutyldimethoxysilane, cyclohexylpentyldimethoxysilane, cyclohexylhexyldimethoxysilane, cyclohexylethyldiethoxysilane, cyclohexylpropyldiethoxysilane, cyclohexylisopropyldiethoxysilane, cyclohexylbutyldiethoxysilane and the like.

Propylene and α-olefin are polymerized by providing hydrogen in order to molecular weight control under the condition that the catalyst system is used at the mole ratio of aluminum atom in the component(b)/titanium atom in the component (a) of 1 to 1000, preferably 5 to 600, and the mole ratio of the component(c)/aluminum atom in the component(b) of 0.02 to 500, preferably 0.05 to 10, the polymerization temperature is 20 to 150° C., preferably 50 to 95° C. and the polymerization pressure is atmospheric pressure to 40 $Kg/cm^2G$.

Next, the propylene-α-olefin random copolymer(B) being other component which constitutes the polypropylene composition of the present invention is obtained by polymerizing propylene and α-olefin, and is the propylene-α-olefin random copolymer, wherein the content of propylene in the propylene-α-olefin random copolymer (B) is 35 to 75% by weight and the content of α-olefin is 25 to 65% by weight.

The content of propylene in the propylene-α-olefin random copolymer (B) is 35 to 75% by weight, preferably 40 to 70% by weight. Besides, the content of α-olefin is 25 to 65%, preferably 30 to 60% by weight. When the content of propylene is less than 35% by weight, the hot-tack strength is inferior and when the content of propylene is more than 75% by weight, the low temperature heat-sealing property is inferior.

As the α-olefin constituting the propylene-α-olefin random copolymer (B), α-olefin used in the crystalline propylene random copolymer (A) can be used similarly. That is, an α-olefin includes an α-olefin having 4 to 10 carbon atoms, for example, butene-1, pentene-1, hexene-1, heptene-1, octene-1, 3-methyl-pentene-1 and the like. Among these, butene-1 is the most preferable. Besides, a small amount of ethylene may be contained within the range not hurting the purpose of the present invention.

The CXS of the propylene-α-olefin random copolymer(B) is preferably 75% or more, more preferably 80% or more by weight in view of a low temperature heat-sealing property of the laminated and oriented film obtained.

As the catalyst for preparing the propylene-α-olefin random copolymer (B) of the present invention, the catalyst used in the crystalline propylene random copolymer (A) can be used similarly and the Ziegler-Natta catalyst containing a solid catalyst component wherein titanium, magnesium, halogen and electron donor are essential is used more preferably. And as these catalysts, the solid catalyst component wherein titanium, magnesium, halogen and electron donor are essential and used for preparing the crystalline propylene random copolymer (A) is exemplified, and the catalyst system comprising this solid catalyst component, (b) the organometallic compound and (c) a silicone compound indicated by the general formula $R^1R^2Si(OR^3)_2$ (R1 represents an alicyclic hydrocarbon group having 5 to 20 carbon atoms and $R^2$, $R^3$ represent hydrocarbon groups having 1 to 20 carbon atoms.) can be mentioned.

The preparation of the copolymer (B) can be performed in both liquid phase and gas phase but it is preferred that the polymerization is performed particularly under the condition that the copolymer dissolves in liquid phase, that is, in the presence of a solvent. In case of performing the polymerization in liquid phase, a solvent method wherein the polymerization is performed in an inactive solvent, for example, a hydrocarbon such as hexane, heptane and kerosene, an alicyclic hydrocarbon such as cyclohexane and an aromatic hydrocarbon such as benzene, toluene and xylene can be used. Or, a bulk method wherein olefin itself is used as a reaction solvent can be used. Among these, it is most preferred to polymerize in the presence of a solvent.

The copolymer used in the present invention can be performed similarly as a polymerization reaction of olefin using usually the Ziegler-Natta catalyst. The temperature of the copolymerization is selected usually within the range of 30 to 140° C., preferably 50 to 120° C. Besides, the polymerization is preferably performed under pressure and usually preferred to be performed under about normal pressure to 50 $Kg/cm^2$. The molecular weight control can be done to a certain degree by changing the polymerization condition such as a polymerization temperature, the rate using the catalyst component and the like, but it is the most effective to add hydrogen in the polymerization system.

As the crystalline propylene polymer (C) in the propylene random copolymer composition of the present invention, a crystalline propylene homopolymer obtained by polymerization of propylene with the Ziegler-Natta catalyst is usually used. However, in certain circumstances, a crystalline propylene polymer copolymerized with a small amount (less than 3% by weight) of an α-olefin other than propylene (ethylene, butene-1 and the like) may be usable. The melting point of the crystalline propylene polymer (C) measured with DSC is preferably 150° C. or more and more preferably 155° C. or more.

Besides, an insoluble part in boiling n-heptane in the polypropylene composition of the present invention is usually detected at the melting peak of crystal derived from the crystalline propylene polymer (C) in a DSC curve obtained by a differential scanning calorie measurement of 152° C. to 168° C. This melting peak depends on the melting calorie changing in accordance with the inclusion amount of the crystalline propylene polymer(C) and when this peak is not detected, the polypropylene random copolymer composition satisfying antinomic properties such as the solvent resistance and the hot-tack property is difficult to be obtained.

The polypropylene random copolymer composition of the present invention comprises the crystalline propylene random copolymer(A) having a propylene content of 60 to 97% by weight, an ethylene content of 0 to 6% by weight and an α-olefin content of 3 to 40% by weight which is obtained by copolymerization of propylene with α-olefin or propylene with α-olefin and ethylene, the propylene-α-olefin random copolymer (B) having a propylene component content of 35 to 75% by weight and an α-olefin component content of 25 to 65% by weight which is obtained by copolymerization of propylene with α-olefin and the crystalline propylene polymer (C). It may be the blend of the crystalline propylene polymer (C), the crystalline propylene random copolymer (A) and the propylene-α-olefin random copolymer (B), or the one being obtained by the copolymerization of propylene with α-olefin or propylene with α-olefin and ethylene after the prepolymerization of propylene or propylene and a small amount of ethylene in advance.

The composition ratio of the crystalline propylene random copolymer (A), the propylene-α-olefin random copolymer (B) and the crystalline propylene polymer (C) in the polypropylene random copolymer composition of the present invention is 73 to 97% by weight, preferably 80 to 95.5% by weight and more preferably 85 to 94.5% by weight of the crystalline propylene random copolymer (A), 2.5 to 17% by weight, preferably 4 to 15% by weight and more preferably 5 to 10% by weight of the propylene-α-olefin random copolymer (B) and besides, 0.5 to 10% by weight, preferably 0.5 to 5% by weight and more preferably 0.5 to 2.7% by weight of the crystalline propylene polymer (C).

When the content of the crystalline propylene random copolymer (A) is less than 73% by weight, the heat-sealing property becomes insufficient. Besides, when the propylene-α-olefin random copolymer (B) is less than 2.5% by weight, an improving effect of the hot-tack property at a low temperature range cannot be recognized, and when it exceeds 17% by weight, the heat-sealing property is improved but the hot-tack property throughout all over the seal becomes worse. On the other hand, when the content of the crystalline propylene polymer (C) is less than 0.5% by weight, the solvent resistance is in sufficient and when it is more than 10% by weight, the transparency becomes inferior and it is not preferred that the hot-tack strength is inferior.

Besides, the said composition having 20% by weight or less of the soluble Dart in xylene at 20° C. is preferably used. The composition being out of this range has a tendency to difficult to be the polypropylene composition having an excellent film-forming property, an excellent solvent resistance and an excellent hot-tack property without hurting a transparency and a heat-sealing property which is the purpose of the present invention.

The polypropylene composition having the melt flow rate of the range of 1 to 50 g/10 min., preferably 2 to 30 g/10 min. and more preferably 3 to 20 g/10 min. is preferred from the view point of the transparency and a high speed processability at film-forming. Besides, the polypropylene composition being soft and having the intrinsic viscosity measured usually at 135° C. in tetralin of the range of 1 to 3 dl/g is used preferably.

To the random copolymer composition of the present invention, an antioxidant, a neutralizer, a lublicant, an anti-blocking agent, an anti-static agent and the like usually used can be blended in accordance with necessity as long as it does not hurt the present invention.

Next, the laminated and oriented film of the present invention is illustrated. The oriented film having the polypropylene composition of the present invention on the surface layer can be film-formed for a long time without hurting a transparency and a heat-sealing property, that is, a preferable property which polypropylene film has originally and the oriented film having an excellent balance of a solvent resistance and a hot-tack property, and having the surface layer laminated on one side or both side of a film being a base material can be obtained.

The laminated and oriented film of the present invention can be prepared by laminating the above-mentioned polypropylene composition on one side or both side of a film being a base material. As a base material, for example a crystalline α-olefin polymer is used and particularly, the crystalline polypropylene is preferably used. The crystalline polypropylene having usually an insoluble part in boiling heptane of 80% or more, the intrinsic viscosity ([η]) of 1.3 to 4.2 dl/g and the propylene content of 95% or more in the polymer can be used preferably. Besides, the crystalline polypropylene may be a copolymer containing ethylene and/or butene-1 components of 5% or less.

The laminated and oriented film of the present invention can be prepared for example, by methods as follows. That is, the laminated and oriented film of the present invention can be prepared by a method passing the base material and a sheet molded in advance with the above-mentioned polypropylene composition through a pressured roll at the same time, a method laminating by painting a solution or a dispersed article wherein the above-mentioned polypropylene composition is dissolved in toluene, a method laminating by coating the above-mentioned polypropylene composition on the base material with a melt-extruding, or a method adhering the above-mentioned polypropylene composition and the base polymer extruded with an extruder in a common die or at an exit while both are in melted state and the like.

The laminated film of the present invention can be used as it is, but the above-mentioned polypropylene composition is preferably oriented with uniaxial or biaxial orientation after the lamination. This laminated and oriented film is prepared by known methods as follows.

That is, there are (1) a method preparing an original laminated sheet with the so-called co-extrusion wherein both are adhered in a die for extrusion molding a sheet or at an exit while both are in melted state and successively orienting biaxially, (2) a method performing an extrusion lamination processing of the above-mentioned polypropylene composition on a base sheet, and successively orienting biaxially, (3) a method orienting uniaxially a base sheet to MD direction with rolls containing a metal roll in a heated state, performing an extrusion lamination processing of the above-mentioned polypropylene composition on the sheet, and successively orienting it to TD direction and the like, but a method(3) is mainly popular among these.

The laminated and oriented film prepared by the above method can be film-formed for a long time without hurting a transparency and a heat-sealing property and has an excellent balance of a solvent resistance and a hot-tack property, and it has an extremely great value for practical uses.

EXAMPLE

The present invention are illustrated by Examples as follow but the present invention is not limited thereto.

Besides, the measured values of each item mentioned in the Detailed Description of the Invention and the Examples were measured in the following manner.

(1) The Content of Butene-1;

It was determined by $^{13}C$ Nuclear Magnetic Resonance spectrum method.

(2) The Content of Ethylene;

It was determined by IR spectrum method described in the item "(i) Random copolymer" of Polymer Analysis Handbook (256 pages) (published by Asakura bookseller's in 1985).

(3) Melt Flow Rate (MFR);

It was determined according to JIS K7210 condition 14.

(4) Haze;

It was determined according to JIS K7105.

(5) Insoluble Part in Boiling n-heptane

A sheet with a thickness of 1 mm obtained by molding according to JIS K 6758 was put in a cylindrical glass filter as fine samples with about 1 mm×1 mm×1 mm mm and extracted for 14 hrs by Sohxlet extractor. In this case the frequency of reflux was one time/5 min. The % by weight of the insoluble part was determined by weighing the insoluble part after drying.

(6) Meting Point (Tm);

After a test piece of 10 mg was melted for 5 min. at 220° C. under a nitrogen atmosphere by using a differential scanning calorie meter (manufactured by Perkin Elmer Company, DSC), it was crystallized by descending temperature until 40° C. at a descending rate of temperature of 5° C./min. After that, temperature was elevated at a rate of 10° C./min., and a temperature of the maximum peak of melted endothermic curve obtained was the melting point. Besides, the melting point of indium (In) measured with the present measurement apparatus at a elevation rate of temperature of 10° C./min. was 156.6° C.

(7) Low Temperature Heat-sealing Property(Heat-sealing temperature ° C.);

Same side of sealant surfaces of two films was piled and heat-sealed by clamping them for 2 seconds under a load of 2 kg/cm$^2$ with a heat-sealer (manufactured by Toyo Seiki Company) heated at a fixed temperature. After letting them alone for one night a sealing temperature wherein a peel resisting strength peeled with a peeling rate of 200 mm/min. at 23° C. and a peeling angle of 180 degree became 300 g/25 mm was measured and this was the heat-sealing temperature.

(8) Hot-tack Property(g/75 mm);

Same side of sealant surfaces of two films was piled and heat-sealed by clamping them for 2 seconds under a load of 2 kg/cm$^2$ with a heat-sealer (manufactured by Tester Sangyo Company) heated at a fixed temperature. Next, a peeling strength was added to the sealing part with a planar spring, immediately after removing a load and a peel strength indicating a peel length of ⅛ inches (3.2 mm) was measured.

(9) Soluble Part in Xylene at 20° C. (CXS) (% by weight);

After dissolving perfectly 1g of a sample in 100 ml of boiling xylene, it was lowered to 20° C. and let alone for 4 hrs. Successively, this was separated to a deposit and a solution by filtration, the filtrate was dried up and dried under vacuum at 70° C. Its weight was measured and % by weight was determined.

(10) Weight Average Molecular Weight Number Average Molecular Weight (Mw/Mn);

It was measured with gel permeation chromatography (GPC) under the following condition. Besides, a calibration curve was made with a standard polystyrene.

| Kinds of machines | 150 CV type manufactured by Milipore Waters Company |
| --- | --- |
| Column | Shodex M/S 80 |
| Measuring temperature | 45° C., solvent o-dichlorobenzene |
| Concentration of a sample | 5 mg/8 ml |

Besides, Standards Reference Material 706 (polystyrene of Mw/Mn=2.1) of NBS (National Bureau of Standard) was measured by the present condition, and a molecular weight distribution (Mw/Mn) of 2.1 was obtained.

(11) Film-forming Property;

The separation of a film from a vertical orientation roll at film-forming was good and the roll being little dirty by the observation with eyes was estimated as ◯ and the roll being good in a separation from the roll and being a little dirty was estimated as Δ.

Reference Example 1

(a) The Synthesis of the Organomagnesium Compound

After an atmosphere in a 1-liter flask with a stirrer, a reflux cooler, a dropping funnel and a thermometer was substituted with argon, 32.0 g of magnesium flake for Grignard was thrown in the flask. To the dropping funnel, 120 g of n-butylchloride and 500 ml of di-n-butyl ether were fed and the reaction was started by dropping about 30 ml to magnesium in the flask. After the start of the reaction, the dropping was continued at 50° C. for 4 hrs and after the dropping, the reaction was continued for 1 hr at 60° C. Successively, the reacted solution was cooled to room temperature and a solid mass was separated by filtration. n-Butyl magnesium chloride in di-n-butyl ether was hydrolized with 1 normal sulfuric acid and its concentration was determined by back titration with 1 normal sodium hydroxide by using phenolphthalein as an indicator. The concentration was 2.1 mol/l.

(b) The Synthesis of the Solid Product

After an atmosphere in a 500 ml flask with a stirrer and a dropping funnel was substituted with argon, 240 ml of hexane, 5.4 g(15.8 mmol) of tetra-n-buthoxytitan and 61.4 g (295 mmol) of tetraethoxysilane were fed and a homogeneous solution was obtained. Next, 150 ml of the organomagnesium compound synthesized in (a) was dropped gradually from a dropping funnel for 4 hrs with keeping a temperature in the flask at 5° C. After the dropping, it was stirred further for 1 hr. and successively, solid-liquid separation was done at room temperature. After repeating 3 times washing with 240 ml of hexane it was dried under vacuum and 45.0 g of a brown solid product was obtained. 1% by weight of titanium atom, 33.8% by weight of ethoxy group and 2.9% by weight of n-buthoxy group were contained in the solid product. Besides, in a broad X-ray diffraction spectrum with Cu-Ka ray of the solid product, no clear diffraction peak was recognized at all and it was amorphous.

(c) The Synthesis of a Solid Treated with Ester

After a 100 ml flask was substituted with argon, 6.5 g of the solid product synthesized in (b), 16.2 ml of toluene and 4.3 ml (16 mmol) of diisobutylphthalate were added and they were reacted for 1 hr. at 95° C.

(d) The Synthesis of the Solid Catalyst (treatment for activation)

After the washing in the above-mentioned (c), 16.2 ml of toluene, 0.36 ml (1.3 mmol) of diisobutylphthalate, 2.2 ml (13 mmol) of n-butyl ether and 38.0 ml (346 mmol) of titan tetrachloride were added in the flask and they were reacted for 3 hr. at 95° C. After the reaction, solid-liquid separation was done at 95° C. and successively, they were washed twice with 33 ml of toluene at same temperature. A treatment by the above-mentioned mixture of diisobutylphthalate, n-butyl ether and titan tetrachloride was repeated once more under the same condition, it was washed three times with 33 ml of hexane and 5.0 g of Chinese yellow solid catalyst was obtained. In the solid catalyst, 2.4% by weight of titanium atom, 18.4% by weight of magnesium atom and 16.8% by weight of phthalate were contained.

(e) The Preparing Method of a Catalyst for Prepolymerization of Propylene

In a 220L reaction vessel substituted adequately with nitrogen internally, 97.9L of butane, 400 g of the Chinese yellow solid catalyst obtained as like as Reference Example (d), 2.6 mol of triethylaluminum (hereinafter, abbreviated as TEA) and 0.384 mol of phenyltrimethoxysilane were added and propylene monomer was reacted at 16° C. for 4.7 hrs. and successively, by collecting the catalyst for prepolymerization, removing a solvent and drying at 60° C. for 3 hrs., the catalyst of the prepolymerization ratio (PP/cat.)=99g-PP/1g-catalyst was obtained. Ash was removed from a part of this, and the melting point (Tm) with DSC of a polymer kneaded with a roll was 165° C.

The preparation of the crystalline propylene random copolymer (A-1) By using an inner volume 1000L fluidized-bed type vessel with a stirrer, the copolymerization of propylene and butene-1 was performed. First of all, circulating nitrogen gas was fed from the lower part of the vessel at a flow rate of 140 m$^3$/hr, and successively, 60 kg of the propylene-butene-1 copolymer particle was fed as a use for dispersing the catalyst dried and substituted in advance. The polymer particle was kept in a fluidized state. Pressure was elevated to 12.5 Kg/cm$^2$ by propylene and after 142.8 g/hr of the prepolymerization catalyst, 39.2 mmol/hr of triethylaluminum and 2.95 mmol/hr of cyclohexylethyldimethoxysilane (hereinafter, abbreviated as CHEDMS) were fed to the reaction vessel, hydrogen, propylene and butene-1 were fed while adjusting a concentration of 0.14% by mol of hydrogen and 21.9% by mol of butene-1 and the polymerization was started while adjusting the fluidized-bed temperature of 65° C. While keeping the polymer particle at 60 Kg, the polymer particle was taken out successively by a differential pressure to a silo, and after monomers were separated from the polymer particle, 0.0075 L/Kg of methanol and 0.0016 g/Kg of Irganox 1076 (manufactured by Ciba-Geigy Co.) were fed and it was treated with hot nitrogen at 60° C. for 2 hrs. Successively, by drying further with hot nitrogen at 60° C. for 1.5 hrs, 10.6 Kg/hr of a white powdery polymer was obtained.

The polymer was Mw/Mn of 3.3, the intrinsic viscosity [η] measured at 135° C. in tetralin of 2.76 dl/g, the butene-1 content of the copolymer determined by $^{13}$C Nuclear Magnetic Resonance spectrum method of 22.4% by weight and CXS of 7.9% by weight.

Reference Example 2

(a) The Preparing Method of a Catalyst for Polymerization of Propylene

150 L of hexane purified adequately was added to a 250 L vessel with a stirrer and after the inside was substituted adequately with nitrogen, 3.2 mol of TEA, 0.32 mol of CHEDMS and 51.8 g converted into titanium atom of the solid catalyst obtained in the prescribed Reference Example (d) were added. 2.8 Kg of propylene was added continuously for 2hrs while keeping 25° C.

The Preparation of the Crystalline Propylene Random Copolymer(A-1)

With using an inner volume 1000 L vessel for polymerization, gas phase polymerization was performed by feeding propylene, ethylene and butene-1 at the hydrogen concentration of the polymerization vessel of 0.22% by weight while feeding the catalyst component prepared in Reference Example 2 (a) at a mean residential time of 6 hours under the condition that polymerization temperature was 80° C. and polymerization pressure was 18 Kg/cm$^2$ and at the same time feeding 5 mmol/hr of CHEDMS (TEA/CHEDMS=10/1 mole ratio). The copolymer obtained was 4.4% by weight of ethylene content, 4.1% by weight of butene-1, and besides, MFR of 2.1, CXS of 6.8% by weight and Mw/Mn of 2.9.

Reference Example 3

(a) The Preparing Method of the Catalyst for Prepolymerization of Propylene 100 ml of hexane purified adequately was added to a 500 ml reaction vessel with a stirrer and after the inside was substituted adequately with nitrogen, 1.24 mmol of TEA, 0.124 mmol of CHEDMS and 0.01 g converted in titanium atom of the solid catalyst obtained in the prescribed Reference Example 1 (d) were added. While keeping 20° C. or less, propylene was added continuously and by adjusting the absorbed amount, the catalyst for prepolymerization of propylene of polypropylene/the solid catalyst=2.4 (weight ratio) was obtained.

The Preparation of the Propylene-α-olefin Random Copolymer(B)

The propylene-butene-1 copolymer was prepared by a continuous polymerization process with using the solid catalyst obtained in the preparation of the catalyst for prepolymerization of propylene in the fore-mentioned Reference Example. The polymerization reaction was performed continuously in a full-tank state with an inner volume 100 l reaction vessel with a warm water jacket and a stirrer. First of all, concerning feeding the catalyst for prepolymerization to the reactor, 150 l of n-hexane and 27.5 g of TEA for protecting the catalyst were prepared in an inner volume 100 l preparing vessel with a stirrer, and 70.5 g of the catalyst for prepolymerization and 27.5 g of TEA were thrown in at the same time, stirred and circulated. The suspended solution was fed continuously to the reactor at a rate of 15L/hr. Concerning feeding an assistant catalyst to the reactor, TEA was diluted with n-hexane in a inner volume 80 L preparing vessel with a stirrer, and 0.035 Kg/hrs as TEA was fed to the reactor. Concerning feeding monomers to the reactor, first of all, 3.6 Kg/hrs of propylene and 12.9 Kg/hrs of butene-1 was fed continuously to a inner volume 300 L preparing vessel and at the same time n-hexane too was fed in order to keep the preparing vessel at a fixed level. The pressure of this monomer solution was elevated by pumping from the preparing vessel and it was cooled at about −5° C. Successively, it was fed continuously to the reaction vessel at a rate of 64 Kg/hrs. Hydrogen was used as a molecular weight modifier and was fed continuously to the reaction vessel by uniting them to the monomer solution line. The temperature of the reaction vessel was kept at 40° C. by adjusting the cooling temperature of the monomer line and the temperature of the warm water jacket. The pressure of the reaction vessel was adjusted to keep 15 Kg/cm$^2$. (A polymer concentration in the reaction vessel was 3.1%) The polymerization reaction was stopped by adding a small amount of methanol in a polymer solution extracted from the reaction vessel and unreacted monomers were removed by removing pressure. Furthermore, after it was washed with aqueous alkali, the copolymer was obtained at a rate of 2 Kg/hr by removing solvent with steam in a lot of water. It was dried in a vacuum dryer with heating apparatus. The content of butene-1 measured by $^{13}$C Nuclear magnetic Resonance spectrum method was 57.9% by weight, and the intrinsic viscosity [η] measured at 135° C. in tetralin was 1.6 dl/g. MFR was 5.6 and Mw/Mn was 3.6.

Example 1

In the crystalline propylene random copolymer (A-1) prepared in Reference Example 1, 0.15% by weight of calcium stearate, 0.1% by weight of Sumilizer BHT, 0.05% by weight of Irganox 1010 and 2,5-dimethyl-2,5-di(tert-butylperoxy)hexane were added and after they were mixed with a Henschel mixer, they were granulated to be pelletized while being decomposed by a peroxide with a 40 φ mm extruder. The MFR of the pellet obtained was 6.7. 5% by weight of the propylene-α-olefin random copolymer(B) obtained in Reference Example 3 and 1% by weight of homopolypropylene (intrinsic viscosity=1.83 dl/g , MFR= 5.1) as the crystalline homopolymer(C) were mixed with the Henschel mixer, and then granulated and pelletized with a 40 φ mm extruder. Thus the polypropylene random copolymer composition illustrated in Table 1 was obtained. Next, Sumitomo Noblen FS 2011 D (manufactured by Sumitomo Chemical Company , MFR=2.5 g/10 min.) as a base material layer and the above-mentioned pellet as a heat-sealing layer of the surface were used and the laminated and oriented film with 3 layers of 2 kinds as obtained with a tenter type stretching machine.

This base material layer at the resin temperature of 257° C. and the heat-sealing layer at the resin temperature of 222° C. were melt-kneaded and solidified in a sheet having 0.9 mm in width by cooling rapidly with a cooling roll of 30° C. Successively, after preheating, it was stretched by quintuple to a vertical direction at 120° C. by the peripheral speed difference of a vertical stretching machine and successively, by octuple to a horizontal direction at 157° C. Heat treatment was performed at 165° C. and the laminated and oriented film with 3 layers of 2 kinds having the sealant thickness of 1 μm and the base material thickness of 20 μm was obtained without an inferior film-forming owing to an adhesion to the roll for even a long time. The film-forming property, the heat-sealing temperature, the hot-tack strength and the transparency(haze) of the film obtained were illustrated in Table 2.

Example 2

An evaluation was performed in the same manner as in Example 1 except changing the mixing ratio of the crystalline propylene random copolymer (A-1), the propylene-α-olefin random copolymer(B) and the polypropylene random copolymer composition illustrated in Table 1 was obtained. The evaluation result was illustrated in Table 2.

Example 3

In the crystalline propylene random copolymer (A-2) prepared in Reference Example 2, 0.1% by weight of calcium stearate, 0.2% by weight of Sumilizer BHT, 0.05% by weight of Irganox 1010 and 2,5-dimethyl-2,5-di(tert-butylperoxy)hexane were added and after they were mixed with a Henschel mixer, they were granulated to be pelletized while being decomposed by a peroxide with a 40 mm extruder. The MFR of the pellet obtained was 5.9. 84% by weight of the pellet obtained, 15% by weight of the propylene-α-olefin random copolymer (B) used in Example 1 and 1% by weight of the crystalline homopolymer (C) were mixed with the Henschel mixer, granulated and pelletized similarly with the 40 mm extruder. Thus the polypropylene random copolymer composition illustrated in Table 1 was obtained. The evaluation result was illustrated in Table 2.

Comparative Example 1

A sample of the crystalline propylene random copolymer (A-1) was evaluated and the evaluation result was illustrated in Table 2.

Comparative Example 2

An evaluation was performed in the same manner as in Example 1 except using the crystalline propylene random copolymer (A-1) obtained in Reference Example 1 and the propylene-α-olefin random copolymer (B) obtained in Reference Example 3 and changing their mixing ratio, and the polypropylene random copolymer composition illustrated in Table 1 was obtained. The evaluation result was illustrated in Table 2.

Comparative Example 3

An evaluation was performed in the same manner as in Example 1 except eliminating the crystalline homopolymer (C), and the polypropylene random copolymer composition illustrated in Table 1 was obtained. The evaluation result was illustrated in Table 2.

When the composition of copolymer and the composition of compositions are out of the range of the present invention, the balance of a film-forming property, a transparency, low temperature heat-sealing property and a solvent resistance with a hot-tack property is inferior and the purpose of the present invention cannot be attained.

According to the present invention, there are provided a polypropylene composition having an excellent film-forming property and giving a laminated and orientated film having an excellent balance of a solvent resistance with a hot-tack property, and a laminated and oriented film having this composition on a surface layer can be obtained.

TABLE 1

| | Crystalline propylene random copolymer (A) | | | | | Propylene α-olefin random copolymer (B) | | | |
|---|---|---|---|---|---|---|---|---|---|
| | content wt % | propylene content wt % | Ethylene content wt % | Butene-1 content wt % | CXS wt % | content wt % | Propylene content wt % | Butene-1 content wt % | CXS wt % |
| Example 1 | 94 | 77.6 | 0 | 22.4 | 7.9 | 5 | 42.1 | 57.9 | 90.4 |
| Example 2 | 89 | 77.6 | 0 | 22.4 | 7.9 | 10 | 42.1 | 57.9 | 90.4 |
| Example 3 | 84 | 91.5 | 4.4 | 4.1 | 6.8 | 15 | 41.6 | 58.4 | 91.5 |
| Comparative Example 1 | 99 | 77.6 | 0 | 22.4 | 7.9 | 0 | — | — | — |
| Comparative Example 2 | 79 | 77.8 | 0 | 22.4 | 7.9 | 20 | 42.1 | 57.9 | 90.4 |
| Comparative Example 3 | 85 | 91.5 | 4.4 | 4.1 | 6.8 | 15 | 41.6 | 58.4 | 91.5 |

| | Crystalline propylene homopolymer (C) | | | Polypropylene composition | | | | |
|---|---|---|---|---|---|---|---|---|
| | Content wt % | M.P.* °0 C. | MFR g/10 min. | Propylene content wt % | Ethylene content wt % | Butene-1 content wt % | CSX wt % | IP** wt % |
| Example 1 | 1 | 165 | 7.1 | 76.1 | 0 | 23.9 | 12.9 | 47.4 |
| Example 2 | 1 | 165 | 6.9 | 74.3 | 0 | 25.7 | 16.5 | 44.7 |
| Example 3 | 1 | 165 | 6.7 | 84.1 | 3.7 | 12.2 | 19.5 | 60.0 |
| Comparative Example 1 | 1 | 165 | 6.7 | 77.6 | 0 | 22.4 | 7.9 | 69.7 |

TABLE 1-continued

| | | | | | | | | |
|---|---|---|---|---|---|---|---|---|
| Comparative Example 2 | 1 | 165 | 7.1 | 70.7 | 0 | 29.3 | 24.5 | 48.8 |
| Comparative Example 3 | 0 | 165 | 7.1 | 84.1 | 3.7 | 12.2 | 20.4 | 2.7 |

*Melting point.
**Insoluble part in boiling n-heptane

TABLE 2

| | Heat sealing temperature | Hot-tack property (g/75 mm) | | | | | | | | | | Trans-parecy | Film-forming |
|---|---|---|---|---|---|---|---|---|---|---|---|---|---|
| | °C. | 65° C. | 75° C. | 85° C. | 95° C. | 105° C. | 115° C. | 125° C. | 135° C. | 145° C. | 155° C. | 165° C. | Haze % | property |
| Example 1 | 92 | | 53> | 70 | 187 | 276 | 295< | 295< | 295< | 116 | 53> | | 1.4 | ○ |
| Example 2 | 82 | 53> | 63 | 133 | 214 | 295< | 295< | 295< | 295< | 86 | 53> | | 1.5 | ○ |
| Example 3 | 79 | | 53> | 60 | 92 | 121 | 127 | 138 | 283 | 71 | 53> | | 2.2 | ○ |
| Comparative Example 1 | 101 | | | | 53> | 177 | 295< | 295< | 295< | 180 | 63 | 53> | 0.9 | ○ |
| Comparative Example 2 | 74 | | 53> | 64 | 67 | 71 | 132 | 240 | 257 | 61 | 53> | | 1.2 | Δ |
| Comparative Example 3 | 78 | | 53> | 67 | 94 | 116 | 136 | 170 | 104 | 84 | 53> | | 2.2 | ○ |

What is claimed is:

1. A polypropylene composition for a laminated and oriented film comprising:
   (A) 73 to 97% by weight of a crystalline propylene random copolymer having a propylene content of 60 to 97% by weight, an ethylene content of 0 to 6% by weight, an α-olefin content of 3 to 40% by weight and a soluble part in xylene at 20° C. of 25% by weight or less, wherein the copolymer is obtained by polymerizing propylene and α-olefin or propylene, ethylene and α-olefin in a gas phase using a solid catalyst component, wherein Ti, Mg, a halogen atom and an electron-donator are essential components;
   (B) 2.5 to 17% by weight of a propylene-α-olefin random copolymer having a propylene content of 35 to 75% by weight, an α-olefin content of 25 to 65% by weight and a soluble part in xylene at 20° C. of 75% by weight or more, wherein the copolymer is obtained by copolymerization of propylene with α-olefin in the presence of a solvent using a solid catalyst component, wherein Ti, Mg, a halogen atom and an electron-donator are essential components; and
   (C) 0.5 to 10% by weight of a crystalline propylene polymer having a melting point of 150° C. or more measured with DSC.

2. A polypropylene composition according to claim 1, wherein the propylene content, ethylene content and α-olefin content in the crystalline propylene random copolymer (A) are 65 to 92%, 0 to 5% and 3 to 35% by weight, respectively.

3. A polypropylene composition according to claim 1, wherein the propylene content, ethylene content and α-olefin content in the crystalline propylene random copolymer (A) are 65 to 83%, 0 to 5% and 13 to 35% by weight, respectively.

4. A polypropylene composition according to claim 1, wherein the propylene content, ethylene content and α-olefin content in the crystalline propylene random copolymer (A) are 65 to 83%, 0% and 17 to 35% by weight, respectively.

5. A polypropylene composition according to claim 1, wherein the polypropylene composition has 20% by weight or less of the soluble part in xylene at 20° C.

6. A polypropylene composition according to claim 1, wherein the α-olefin in the crystalline propylene random copolymer(A) is butene-1.

7. A polypropylene composition according to claim 1, wherein the α-olefin in the propylene random copolymer(B) is butene-1.

8. A polypropylene composition according to claim 1, wherein the crystalline propylene polymer(C) has a melting point of 150° C. or more measured with DSC.

9. A polypropylene composition according to claim 8, wherein the crystalline propylene polymer(C) is a crystalline propylene homopolymer or crystalline propylene copolymer having an ethylene or butene-1 content of less than 3% by weight.

10. A polypropylene composition according to claim 1, wherein the soluble part in xylene at 20° C. of said composition is 20% by weight or less.

11. A laminated and oriented film, wherein it has a layer of the polypropylene composition defined in claim 1 as a surface layer.

12. A laminated and oriented film obtained by laminating a polypropylene composition for a laminated a oriented film defined in claim 1 on at least one surface of a crystalline polypropylene film and orienting the resulting laminate.

* * * * *